(No Model.)
R. T. D. BROUGHAM & W. C. BERSEY.
SUSPENDING BATTERIES ON CARRIAGES.
No. 602,302. Patented Apr. 12, 1898.
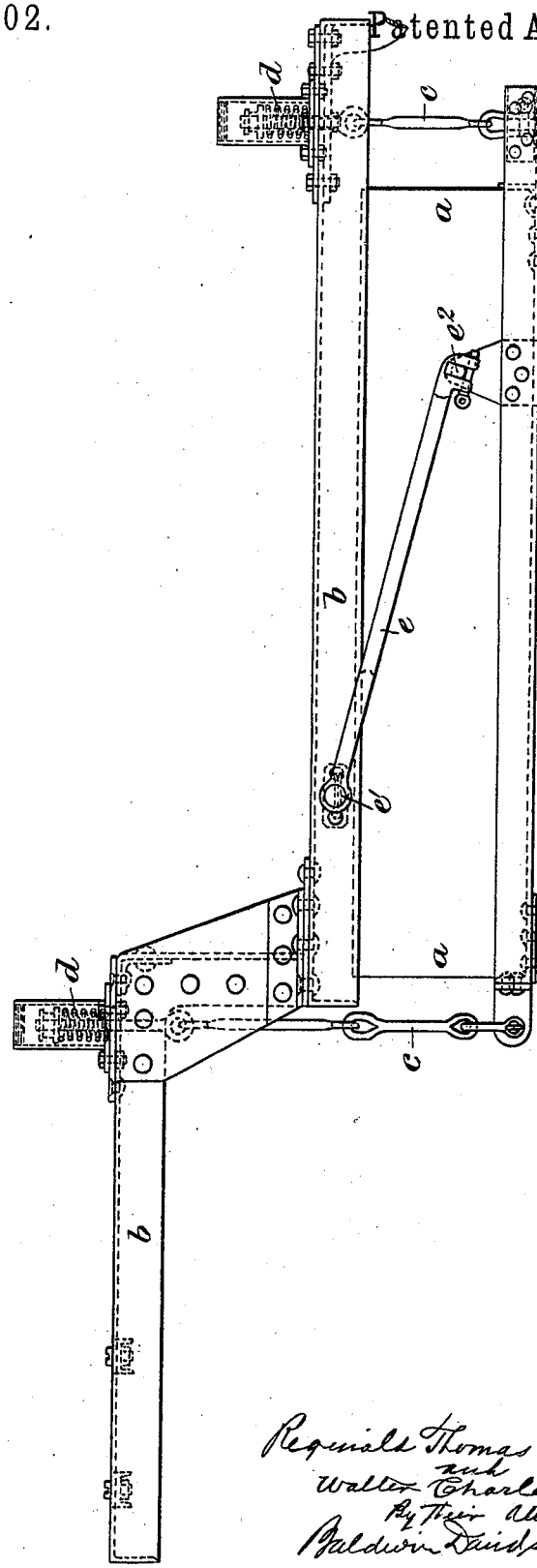
Witnesses
Inventors
Reginald Thomas Dudley Brougham
and
Walter Charles Bersey
By their attorneys
Baldwin Davidson & Wight.

UNITED STATES PATENT OFFICE.

REGINALD THOMAS DUDLEY BROUGHAM AND WALTER CHARLES BERSEY, OF LONDON, ENGLAND, ASSIGNORS TO THE ELECTRICAL VEHICLE SYNDICATE, LIMITED, OF SAME PLACE.

SUSPENDING BATTERIES ON CARRIAGES.

SPECIFICATION forming part of Letters Patent No. 602,302, dated April 12, 1898.

Application filed December 13, 1897. Serial No. 661,725. (No model.)

*To all whom it may concern:*

Be it known that we, REGINALD THOMAS DUDLEY BROUGHAM, residing at 22$^a$ Dorset street, Portman Square, and WALTER CHARLES BERSEY, residing at 28 Victoria street, Westminster, London, in the county of Middlesex, England, subjects of the Queen of Great Britain, have invented certain new and useful Suspending Batteries on Carriages, of which the following is a specification.

According to this invention the box containing the electrical accumulators or batteries used for the propulsion of motor-carriages is suspended at its corners by rods and links which are carried by springs mounted on the frame of the vehicle, the springs allowing motion in a vertical direction. At each side of the box there is a radial bar which is pivoted at one end to the frame of the carriage and at the other end to the box. By these means undue oscillations and shocks liable to injure the accumulators or batteries are prevented.

In the drawing, $a$ is the box containing the accumulators or batteries, and $b$ is the frame of the machine.

$c$ are the links from which the box $a$ is suspended, and $d$ are the springs carrying them.

$e$ are radial bars pivoted at $e'$ to the frame and at $e^2$ to the box.

What we claim is—

1. The combination of the carriage-frame, a box, springs suspending the box from the frame and a rod pivoted at one end to the frame and at the other to the box.

2. The combination of the carriage-frame, springs supported by the frame, links supported by the springs, a box hung on the links and a rod pivoted at one end to the frame and at the other to the box.

REGINALD THOMAS DUDLEY BROUGHAM.
WALTER CHARLES BERSEY.

Witnesses:
FRANK HOWELL HAYS,
ROBERT B. RANSFORD.